United States Patent
Dorsey et al.

(10) Patent No.: US 8,842,040 B1
(45) Date of Patent: Sep. 23, 2014

(54) MUTUAL COUPLING BASED CALIBRATION TECHNIQUE FOR STRUCTURALLY DEFORMED PHASED ARRAY APERTURES

(75) Inventors: W Mark Dorsey, Elkridge, MD (US); Rashmi Mital, Lorton, VA (US); Mark G Parent, Port Tobacco, MD (US); Doug Taylor, Indian Head, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 520 days.

(21) Appl. No.: 13/108,388

(22) Filed: May 16, 2011

Related U.S. Application Data

(60) Provisional application No. 61/355,720, filed on Jun. 17, 2010.

(51) Int. Cl.
*G01S 7/40* (2006.01)
*H01Q 3/26* (2006.01)

(52) U.S. Cl.
CPC .............. *H01Q 3/267* (2013.01); *G01S 7/4021* (2013.01)
USPC ........................................................ 342/174

(58) Field of Classification Search
CPC .............................. G01S 7/4021; H01Q 3/267
USPC ........................................................ 342/174
See application file for complete search history.

(56) References Cited

U.S. PATENT DOCUMENTS

| | | | | |
|---|---|---|---|---|
| 3,623,111 | A * | 11/1971 | Provencher et al. | 343/727 |
| 5,027,107 | A * | 6/1991 | Matsuno et al. | 340/572.7 |
| 5,682,165 | A * | 10/1997 | Lewis et al. | 342/174 |
| 6,356,233 | B1 * | 3/2002 | Miller et al. | 342/368 |
| 6,615,024 | B1 * | 9/2003 | Boros et al. | 455/67.14 |
| 7,362,266 | B2 * | 4/2008 | Collinson | 342/372 |
| 2008/0297402 | A1 * | 12/2008 | Wooldridge | 342/174 |

OTHER PUBLICATIONS

D.McWalters, A. Freedman. T. Michel, and V. Cable, "Antenna auto-calibration and metrology approach for the AFRL/JPL space based radar," Radar Conference, 2004. Proceedings of the IEEE. 0-7803-8234-X/04, pp. 21-26, 26-29. (Apr. 2004).

C. Shipley, D. Woods, "Mutual coupling-based calibration of phased array antennas," Phased Array Systems and Technology, 2000. Proceedings. 2000 IEEE International Conference on, 0-7803-6345-0/00. pp. 529-532. (2000).

W. Yao, Y. Wang, and T. Itoh, "A self-calibration antenna array system with moving apertures," Microwave Symposium Digest, 2003 IEEE MTT-S International, vol. 3, pp. 1541-1544, (Jun. 8-13, 2003).

(Continued)

*Primary Examiner* — Frank J McGue
(74) *Attorney, Agent, or Firm* — US Naval Research Laboratory; L. George Legg

(57) ABSTRACT

A phased array antenna includes a plurality of subarrays, and each subarray includes a panel, a plurality of primary antenna elements positioned on the panel, and at least one pair of sensor antenna elements positioned along a perimeter of the panel. One of the sensor antenna elements is a transmitting sensor antenna element and the other sensor antenna element is a receiving sensor antenna element. Changes in the mutual coupling between the two high frequency sensor antenna elements as a function of deformation of the subarrays provides a calibration signal outside of the operational band of the array while the array is operated and without requiring external calibration sources.

9 Claims, 2 Drawing Sheets

(56) References Cited

OTHER PUBLICATIONS

E. A. Lee, C. N. Dorny, "A broadcast reference technique for self-calibration of large antenna phased arrays," Antennas and Propagration, IEEE Transactions on, vol. 37, No. 8, pp. 1003-1010, (Aug. 1989).

H. S. C. Wang, "Performance of Phased Array Antennas with Mechanical Errors," IEEE Transactions on Aerospace and Electronic Systems, vol. 28, No. 2, pp. 535-545, (Apr. 1992).

Y. E. Erdemil, K. Sertel and R. A. Gilbert, "Frequency-Selective Surfaces to Enhance Performance of Broad-band Reconfigurable Arrays", IEEE Transactions on Antennas and Propagation, vol. 50, No. 12, pp. 1716-1724, (Dec. 2002).

* cited by examiner

MUTUAL COUPLING BASED CALIBRATION TECHNIQUE FOR STRUCTURALLY DEFORMED PHASED ARRAY APERTURES

CROSS-REFERENCE TO RELATED APPLICATIONS

This Application claims the benefit of U.S. Provisional Application 61/355,720 filed on Jun. 17, 2010 and incorporated herein by reference.

FIELD OF THE INVENTION

The present invention is directed to a radar array calibration system and method, and more particularly to the calibration of a modular phased array consisting of multiple subarrays.

BACKGROUND OF THE INVENTION

Phased array antennas on future Navy ships may be embedded directly onto the ship's structure. By embedding the antennas directly into the ship's structure, it will be possible to make full use of available space on the body of the ship and free up critical space on the ship deck for other critical radars necessary for increasing Navy requirements. However, the ship structure can deform due to mechanical and thermal stresses and these stresses can significantly degrade the antenna radiation pattern.

Ships like DDG-1000, CG(X) and DDG(X) are going to have a large number of cut-outs. Modular antenna array antennas are going to be placed into these cut-outs. Unlike integrated (no cut-out) designs, which are able to maintain structural continuity, the cut-out design suffers from structural inefficiencies such as lack of stiffness, vibration and weight resulting in deformations of the antenna array shape. These deformations cause the antenna pattern to be different than predicted resulting in the degradation of the sidelobe levels (SLL), gain, and beam pointing accuracy. It is important that these errors resulting from the deformations are corrected for so that the antenna array maintains the desired radiation characteristics.

The technique described in McWatters, D.; Freedman, A.; Michel, T.; Cable, V., "Antenna auto-calibration and metrology approach for the AFRL/JPL space based radar," *Radar Conference, 2004. Proceedings of the IEEE*, vol., no., pp. 21-26, 26-29 Apr. 2004 uses cameras and receivers placed on a tower to determine the location of the radiating elements in a large array. Triangulation and other metrology techniques are then used to determine any deformations that exist within the aperture, and the phase at each element is then calibrated to correct the pattern shape. This technique allows for in situ calibration, but it requires the installation of a calibration tower for the integration of calibration receivers, transmitters, antennas, and cameras.

The calibration technique introduced in Shipley, C.; Woods, D., "Mutual coupling-based calibration of phased array antennas," *Phased Array Systems and Technology, 2000. Proceedings. 2000 IEEE International Conference on*, vol., no., pp. 529-532, 2000 relies on the mutual coupling between elements in the array. In this technique, the calibration signals lie within the operational band of the antenna array. As a result, calibration is not permitted during array operation.

The scheme used in Weijun Yao; Yuanxun Wang; Itoh, T., "A self-calibration antenna array system with moving apertures," *Microwave Symposium Digest, 2003 IEEE MTT-S International*, vol. 3, no., pp. 1541-1544 vol. 3, 8-13 Jun. 2003 uses calibration signals from multiple calibration sources mounted in front of the array. The near-field signals from the calibration sources are monitored, and changes in the signal amplitude and/or phase indicate the need to correct the element excitation. A similar technique is used in Meyer, R. X.; "Electronic Compensation for Structural Deformations of Large Space Antennas", *Astrodynamics Proceedings of the Conference*, Vail, Colo., Aug. 12-15, 1985. pp. 277-285, where the elements in the array receive a signal from calibration sources mounted on a mast near the aperture. In Lee, E.-A.; Dorny, C. N., "A broadcast reference technique for self-calibrating of large antenna phased arrays," *Antennas and Propagation, IEEE Transactions on*, vol. 37, no. 8, pp. 1003-1010, August 1989, Lee and Dorny also present a calibration technique for large arrays that requires the integration of auxiliary calibration beacon signals.

Accordingly, these calibration procedures either 1) do not permit calibration during array operation or 2) require external sources to provide a calibration signal to the radiating elements in the array. It would be desirable to provide a calibration technique without these shortcomings.

BRIEF SUMMARY OF THE INVENTION

According to the invention, a phased array antenna includes a plurality of subarrays, and each subarray includes a panel, a plurality of primary antenna elements positioned on the panel, and at least one pair of sensor antenna elements positioned along a perimeter of the panel. One of the sensor antenna elements is a transmitting sensor antenna element and the other sensor antenna element is a receiving sensor antenna element.

The invention provides a calibration methodology based on determining how the mutual coupling between sensor antennas elements changes as a function of deformation. The calibration method correlates the changes in the mutual coupling of corner mounted sensor antennas.

The advantages of this technique lie in its ability to provide in situ calibration without the requirement for external calibration sources. The invention uses mutual coupling between high frequency elements mounted at the corners of small subarrays to provide a calibration signal outside of the operational band of the array. As a result, real-time calibration is enabled.

DETAILED DESCRIPTION OF THE INVENTION

Large antenna arrays are often constructed modularly in order to simplify transportation and installation of the array. The individual panels of a modular antenna array are referred to as subarrays. In many applications, the subarray panels are required to serve as structural members of the overall array. Therefore, the subarray panels are subjected to mechanical and thermal stresses that can alter the subarray shape and location. Deformation of the subarray configuration results in changes to the pointing angle and physical location of each array element. Subsequently, the performance of the antenna array is degraded.

The complex excitation of the elements within the antenna array can be altered to optimize the performance of the deformed antenna array. The disclosed calibration methodology correlates the changes in the mutual coupling of sensor antennas to physical changes in aperture shape. Once the physical deformations are understood, the proper complex element excitations can be determined to improve array performance.

Figure 1A:
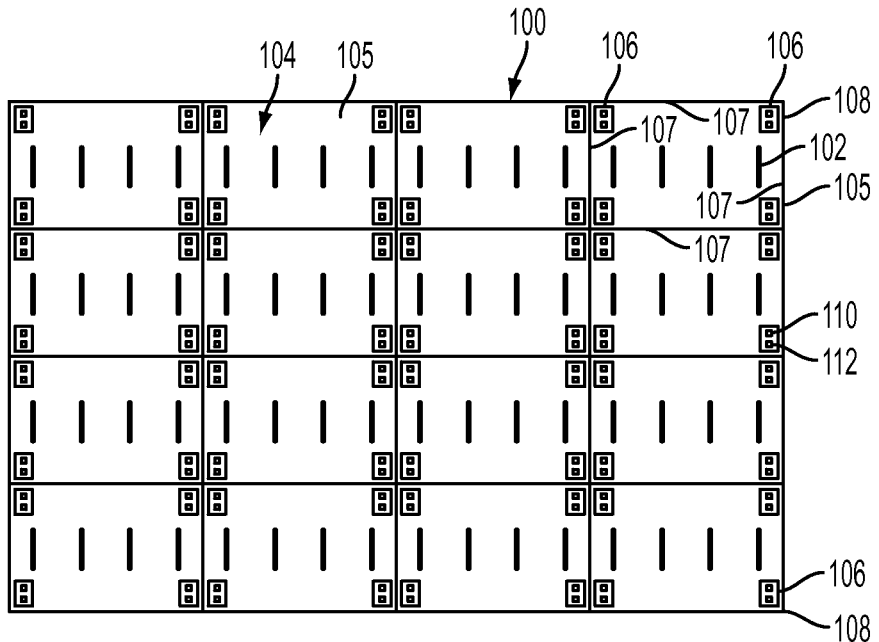
FIG. 1A is a schematic illustration of a phased array antenna, and FIG. 1B a schematic illustration of a subarray of the phased array antenna, according to the invention.
Figure 1B:
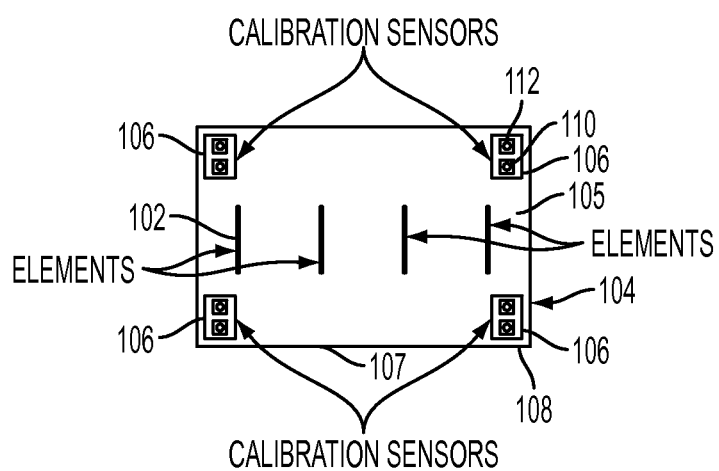

An illustration of an antenna array employing this technique according to the invention is illustrated in FIG. 1. Referring now to FIG. 1A, antenna array 100 contains 64 radiating primary antenna elements 102 that operate over frequency band $f_1$. These elements 102 are grouped into subarrays 104 of 4 elements (see FIG. 1B) positioned on a panel 105.

Each subarray 104 contains a pair 106 of sensor antennas positioned along a perimeter 107 of panel 105 and in the embodiment shown proximate to each of four corners 108; one element 110 in each pair serves as a transmitting sensor antenna while the other element 112 serves as a receiving sensor antenna. However, this technique is not restricted to four sensor antenna pairs per subarray, as the overall number and layout of sensors can be modified to suit arbitrary antenna array geometries. The geometry or layout of the array 100 and subarrays 104 as well as the relative spacing of the primary antenna elements 102 and the pairs 106 of sensor antennas may vary according to the application and installation requirements and is not limited to the specific embodiments discussed herein.

The signal transmitted out of the $i^{th}$ sensor pair is defined as $a_i$, and the signal received from the $j^{th}$ sensor pair is defined as $b_j$. For the illustration in FIG. 1, i and j are integers within [1, 64] that identify the transmitting and receiving sensor antenna pair respectively. The scattering matrix S for the network of sensor antenna pairs is defined in (1), and S will change as the sensor antenna locations and orientations are distorted. Changes in the scattering matrix are characterized as a function of translational and rotational displacement to provide a lookup table for determining the overall distortion of each element. Once the distortion is known, a calibration coefficient is determined to optimize the performance of the array. The disclosed calibration technique utilizes the altered scattering matrix for the sensor antennas to determine the true physical location of the antenna elements within the deformed subarray panel.

$$S=[S_{ij}], \text{ where } S_{ij}=b_j/a_i \quad (1)$$

The sensor antennas operate at a frequency $f_2$ that is well above the operational frequency band of the antenna ($f_1$). The sensor antennas are chosen to operate at a higher frequency for two primary reasons: (1) By operating outside of the antenna array's operational frequency range ($f_1$), the sensor antennas will have minimal interference with the antenna array elements, and (2) by operating at a frequency with a small wavelength, the coupling between sensor antennas will have increased sensitivity to smaller displacements.

Figure 2A:
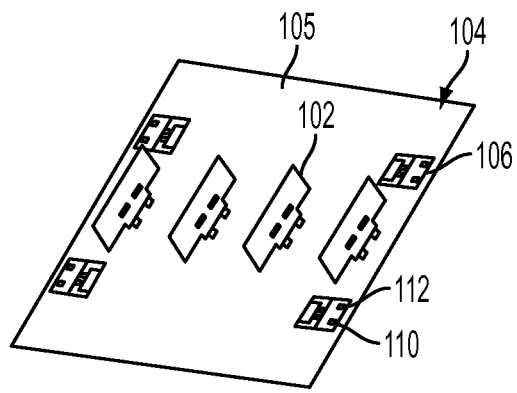
FIGS. 2A-C are schematic illustrations of specific embodiments of the components of the phased array antenna according to the invention.
Figure 2B:
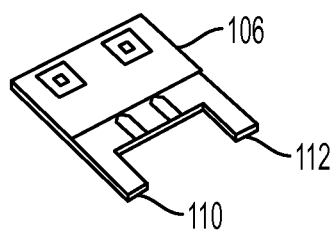
Figure 2C:
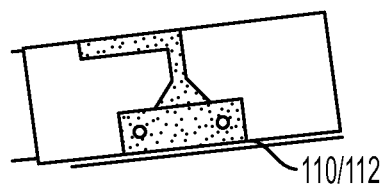

A typical embodiment of the invention is illustrated in FIG. 2. Subarray 104 panel contains four vertically polarized S-band dipole elements 102 and four horizontally polarized sensor antenna pairs 106. The sensor antennas 110 and 112 are X-band shorted square ring antennas. The X-band shorted square ring elements operate in the fundamental $TM_{01}$ mode because it radiates a conical shaped pattern with the maximum value near endfire. This radiation pattern directs more of the energy towards the elements on adjacent panels than the typical $TM_{11}$ mode broadside pattern and maximizes the signal-to-noise ratio for the calibration signals.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed as new and desired to be protected by Letters Patent of the United States is:

1. A phased array antenna, comprising:
    a plurality of subarrays, wherein each subarray comprises:
        a panel;
        a plurality of primary antenna elements positioned on the panel; and
        at least one pair of sensor antenna elements positioned along a perimeter of the panel, wherein a first antenna element of the pair of sensor antenna elements is a transmitting sensor antenna element and a second antenna element of the pair of sensor antenna elements is a receiving sensor antenna element; and
    wherein at least one of said subarrays comprises a panel having four sides and four corners with the plurality of primary antenna elements spaced apart from the corners and with a pair of sensor antenna elements positioned proximate to each corner, wherein the plurality of subarrays are configured to form an integral structure such that opposing subarray sides are not spaced apart and wherein the pair of sensor antenna elements are a higher frequency than the plurality of antenna elements.

2. The phased array antenna of claim 1, wherein the plurality of primary antenna elements are vertically polarized S-band dipole elements and the pairs of sensor antenna elements are horizontally polarized sensor antenna pairs.

3. The phased array antenna of claim 1, wherein the pairs of sensor antenna elements are X-band shorted square ring antennas.

4. A method of calibrating a phased-array antenna during operation, the phased-array antenna having a plurality of subarrays, wherein each subarray includes a panel having a perimeter and a plurality of corners and a plurality of primary antenna elements positioned on the panel and at least one of said subarrays comprises a panel having four sides and four corners with its plurality of primary antenna elements spaced apart from the corners and with a pair of sensor antenna elements positioned proximate to each corner, comprising:
    positioning a pair of sensor antenna elements proximate to each corner wherein a first antenna element of the pair of sensor antenna elements is a transmitting sensor antenna element and a second antenna element of the pair of sensor antenna elements is a receiving sensor antenna element;
    transmitting a signal from the transmitting sensor antenna element to the receiving sensor antenna element;
    computing a scattering matrix for the pair of sensor antenna elements; and
    determining a true physical location of the plurality of primary antenna elements based on the computed scattering matrix, wherein the plurality of subarrays are configured to form an integral structure such that opposing subarray sides are not spaced apart wherein the sensor antenna elements are a higher frequency than the plurality of antenna elements.

5. The method of claim 4, wherein the plurality of primary antenna elements are vertically polarized S-band dipole elements and the sensor antenna elements are horizontally polarized sensor antennas.

6. The method of claim 4, wherein the sensor antenna elements are X-band shorted square ring antennas.

7. A ship-mounted phased array system for a ship having a plurality of cutouts each for receiving and positioning therein a phased array radar system comprising:
   a plurality of subarrays, wherein each subarray comprises:
   a panel;
   a plurality of primary antenna elements positioned on the panel; and
   at least one pair of sensor antenna elements positioned along a perimeter of the panel, wherein a first antenna element of the pair of sensor antenna elements is a transmitting sensor antenna element and a second antenna element of the pair of sensor antenna elements is a receiving sensor antenna element; and
   wherein at least one of said subarrays comprises a panel having four sides and four corners with the plurality of primary antenna elements spaced apart from the corners and with a pair of sensor antenna elements positioned proximate to each corner, wherein the plurality of subarrays are configured to form an integral structure such that opposing subarray sides are not spaced apart and wherein the sensor antenna elements are a higher frequency than the plurality of antenna elements.

8. The ship-mounted phased array system of claim 7, wherein the plurality of primary antenna elements are vertically polarized S-band dipole elements and the sensor antenna elements are horizontally polarized sensor antenna pairs.

9. The ship-mounted phased array system of claim 7, wherein the sensor antenna elements are X-band shorted square ring antennas.

* * * * *